May 12, 1925. 1,537,348

H. GROSSMANN

APPARATUS FOR THE MANUFACTURE OF IGNITION PELLETS, HAVING
A COMBUSTIBLE CORE AND AN IGNITION MATERIAL WHICH
MAY BE KINDLED ON A FRICTION SURFACE

Filed Nov. 26, 1921  3 Sheets-Sheet 1

Inventor:
Hans Grossmann,
By Henry Orth Jr.
atty.

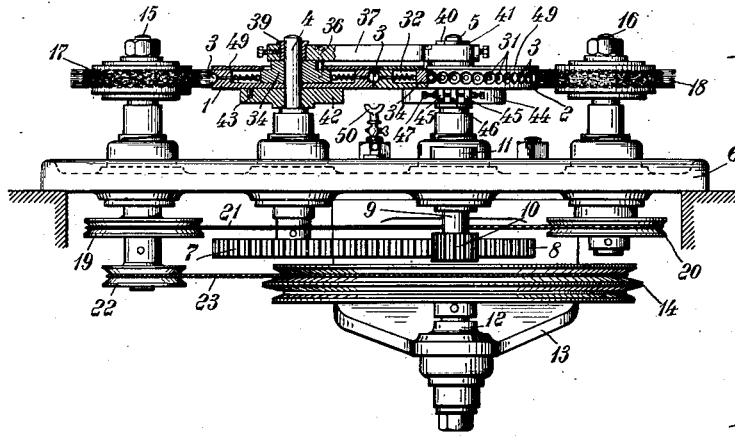
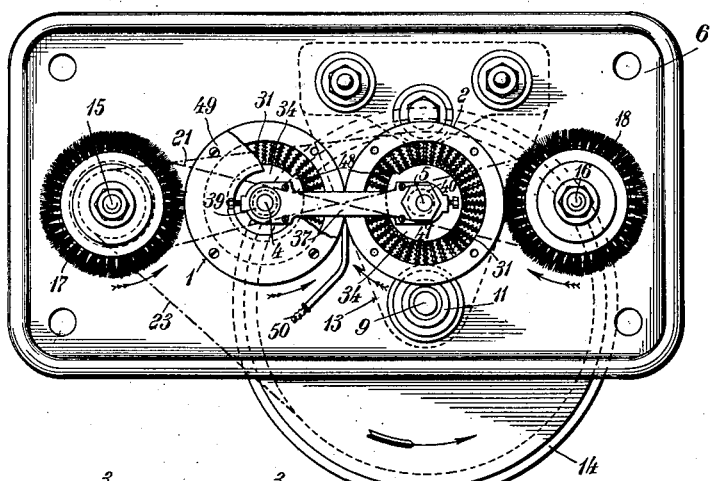
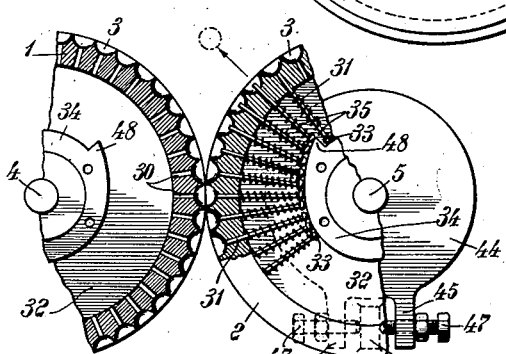
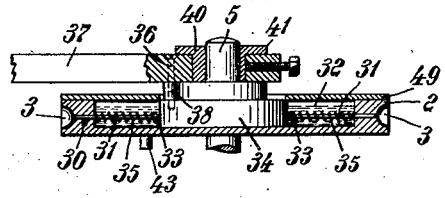

Patented May 12, 1925.

1,537,348

UNITED STATES PATENT OFFICE.

HANS GROSSMANN, OF ZURICH, SWITZERLAND.

APPARATUS FOR THE MANUFACTURE OF IGNITION PELLETS, HAVING A COMBUSTIBLE CORE AND AN IGNITION MATERIAL WHICH MAY BE KINDLED ON A FRICTION SURFACE.

Application filed November 26, 1921. Serial No. 518,077.

*To all whom it may concern:*

Be it known that I, Dr. HANS GROSSMANN, a citizen of the Republic of Switzerland, residing at Zurich, Switzerland, have invented certain new and useful improvements in apparatus for the manufacture of ignition pellets, having a combustible core and an ignition material which may be kindled on a friction surface; and I do hereby declare the following to be a clear, full, and exact description of the invention, such as will enable others skilled in the art to which it appertains to make and use the same, reference being had to the accompanying drawings, and to letters or figures of reference marked thereon, which form a part of this specification.

The subject matter of the present invention is an apparatus for the manufacture of ignition bodies or pellets. having a combustible core and an ignition material which may be kindled on a friction surface, wherein the kindling material is distributed on all sides of the surface of the combustible core and may also be provided in the interior of said core, the latter consisting, advantageously, of a mixture of various combustible substances or of such substances with noncombustible ones. Such an apparatus must be capable of producing several million bodies per day and must also be adapted to handle materials of different kinds, either homogeneous materials or mixtures, and also handle substances which are sticky or adhere readily to metals. Further any required shapes must be produced on it, even though of quite small dimensions, while the shaped bodies produced by it must be possessed of a certain stability. An apparatus which satisfies these requirements in a simple manner, is according to the invention, provided with two circumferentially co-acting discs rotating in opposite directions and having molds on their circumference which shape the plastic material fed in between the discs, the circumferential velocities of the discs and the arrangement of cavities on the circumferences being so chosen that the co-operating cavities of the discs, in their rotation, exactly coincide; and further mechanism is provided for the removal of the formed bodies.

Further means are provided to supply the material to be shaped between the mold discs in an appropriate way and means to finish the shaped material by coating it with ignition material.

In the drawings constructional forms of the invention are shown by way of example, Fig. 1 representing an elevation of one form, and Fig. 2 a plan of the same, while Fig. 3 shows a vertical section taken on the line III—III in Fig. 1.

Fig. 4 shows an elevation of a second constructional form partly in section,

Fig. 5 being a plan thereof.

Fig. 6 reproduces a detail of the second constructional form, parts being in horizontal section and Fig. 7 reproduces a detail of the second constructional form in vertical section, the section being taken through one of the discs, partially in front view.

Figure 1:
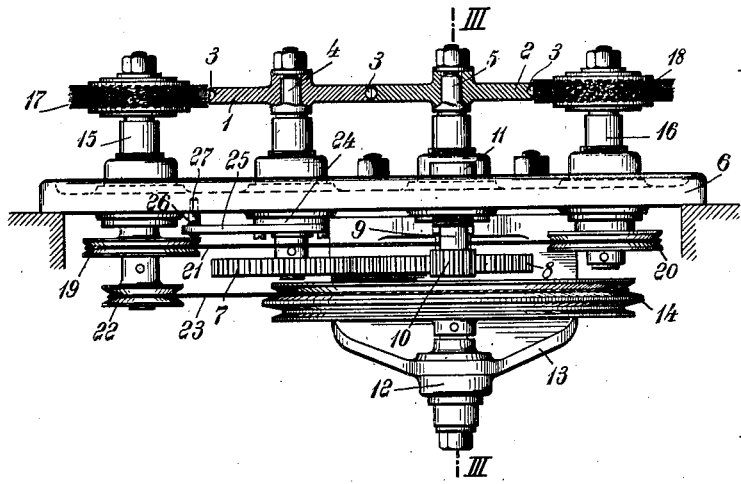

1 and 2 denote two discs along whose circumferences are distributed cavities 3. The two discs 1 and 2 are rigidly connected to vertical axes 4 and 5, which are mounted in a base plate 6 common to both at such a distance from each other that the discs 1 and 2 touch with their circumferences. Beneath the base plate the axes 4 and 5 are provided with cog wheels 7 and 8, which mesh with each other. A pinion 10 mounted on a vertical driving shaft 9 engages with the cog wheel 8. The driving shaft 9 is mounted at its upper end at 11 in the base plate and at its lower end, at 12, in a bearing arm 13 rigidly connected with the base plate. To the driving shaft rotary motion is imparted by means of a grooved disc 14 fastened upon it, the rotary motion being transmitted to the disc by means of transmitting gear but the driving member is not shown in the drawing. In the base plate 6, are further mounted two vertical shafts 15 and 16 which at their extremities situated above the base plate carry circular brushes 17 and 18 which rub against the circumferences of discs 1 and 2. The parts of the shafts 15 and 16 situated below the base plate are provided with grooved discs 19 and 20 around which is passed a crossed driving member 21 such as, for example, a cord. On the shaft 15 is mounted a second grooved disc 22 which is connected with the upper groove of the grooved disc 14 by a driving member 23. The axis 4 of the one disc is eccentrically mounted in a bearing-bush 24 mounted in the base plate 6. To the bearing bush is attached one end of a lever 25 to the free end of which is fastened an end of a tension spring 26 the other end of which is, at 27, fixed in the under side of the base plate.

Figure 2:
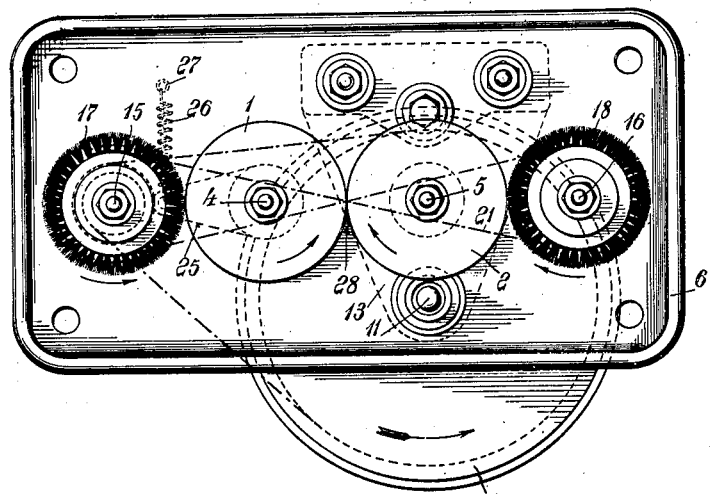
Figure 3:
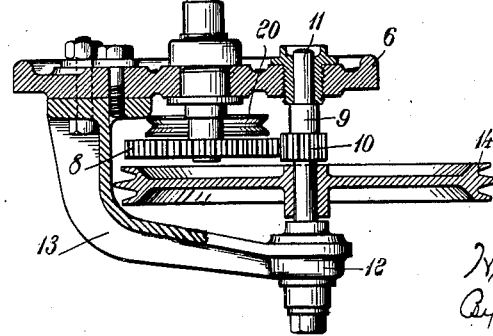

The manner of operation of the machine just described is as follows: When from any source of power the grooved disc 14 is driven in the direction of the arrow, Fig. 2, both discs 1 and 2 are, by means of the toothed gear 10, 8 and 7 set in rotation in opposite directions. A condition for the proper functioning of the machine is that the circumferential velocities and the distribution of the cavities along the circumferences of the two discs should be so chosen that a cavity on the one disc invariably coincides with a cavity on the other disc, as these cooperating cavities are complementary to each other in giving shape to the plastic material. The brushes 17 and 18 are at the same time rotated in the direction of the arrows by means of the cord passing round the grooved discs. The plastic material is fed in between the discs at 28 in the form, for example, of a continuous cord or ribbon of expressed material. Owing to the wedge action of the rotating discs the plastic material is pressed into the disc cavities, the superfluous material being expressed and rejected. The spring 26 which affects the eccentric mounting of the one disc axis, effects a bearing of the one disc snugly and resiliently against the other. Once the material is shaped and after it has passed the point of contact of the two discs it remains adhering in the cavity of either the one or the other of the discs whereafter by rotation, it arrives within operative field of the rotating brushes and is by them removed from the discs.

The cavities themselves may have a manifold number of forms so that the plastic material may also be worked up into shapes of all kinds.

Experience has now shown that certain materials which possess a greater adhesiveness to metals, adhere longer in the cavities so that the working efficiency of the machine is impaired. In certain cases the rotary brushes provided are not sufficient to remove the combustible cores when formed. But to facilitate the removal of the formed bodies from the cavities on the circumferences of the discs it is advantageous that the cavities should be in communication, each one of them, with a bore, wherein is located an ejector pin that has reciprocal movement within the cavity under the control of a stationary cam disc and against the action of a spring, the cam discs being arranged in such a way that this motion of the pin takes place shortly after the formation of the body, that is of the combustible core, has been completed, as shown in Figs. 4 to 7.

In order that the completely automatic working of the machine may not be disturbed by the formed cores not all being removed and in order that the latter may be certainly ejected from the cavities, each cavity 3 communicates with the bore 30 in which is located a pin 31 which moves until it is exactly flush with the mouth of the bore in the cavity, and therefore does not project into the cavity. The rear extremity of the pin 31 is situated in a groove 32 which is provided in each disc, and carries a button 33 which bears against the cam disc 34. This cam disc does not rotate with its corresponding disc but remains stationary and is mounted in such a way on the disc 1 or 2 that all the buttons 33 bear against the circumference of the cam disc. Each pin 31 is surrounded by a spring 35 so as to secure a certain contact between the buttons 33 and the disc 34. The disc 34 is fixedly connected by means of a pin 36 to a stirrup 37 connecting together the two axes 4 and 5. Between the stirrup 37 and the cam disc is arranged a distance member, and between the stirrup 37 and the axis 4 is a bushing 39. Between the stirrup 37 and the axis 5 is situated an eccentrically bored bushing 40, which, at its upper extremity, is formed as a nut 41 for the purpose of adjusting the bushing 40. When the bushing 40 is rotated a variation in the pressure with which the disc 2 bears against disc 1 takes place, the pressure being capable of being either increased or diminished according to necessity.

Disc 1 is seated on and rigidly connected to a plate 42 by means of a pin 43. Disc 2 rests on a plate 44 which is integral with the spindle 5 and carries two parallel lugs 45 between which projects a lug or beak 46 on the underside of disc 2. Through each lug 45 projects an adjusting screw 47 maintaining the lug 46 in position relatively to the two lugs 45. By adjusting the screw 47 the lug 46 may be displaced and along with it the disc 2. This adjustment is of importance because the mounting of the two discs 1 and 2 in such a manner, that the cavities 3 on their circumferences coincide with each other with a hair breadth's accuracy, is attended with technical difficulties, a condition which is of very great importance for the manufacture of nicely shaped combustible cores. The screws 47 with the lugs 45 and lug 46 render a mathematically exact adjustment possible, the adjustment being carried out to tenths of a millimetre. In this way it is possible to secure accurate register of one mold half with the other mold half of the companion disc.

The second disc may also be provided with similar adjusting means if desired.

The headless ends of pins 31 are, as shown in the drawings, exactly in the centre of the mold cavities 3, and extend exactly to the bottom of these cavities, so that the pins, in their unprojected positions, in no way interfere with the shape of the cavities. As soon as the forming discs 1 and 2 begin to move, past the molding position the pins are projected by the two stationary cam discs 34. This ejecting movement is effected by the cam 46 and the material inside the cavities or in the mold either of the one or the other of the shaping discs, is loosened and will thereafter either automatically leave the disc or be finally brushed from it by the rotary brushes 17 and 18.

By this arrangement strongly adhesive material may, without friction during continuous operation, be converted into combustible cores having the form for example of pellets or pills having even a very small diameter.

To permit of the apparatus functioning with certainty, the grooves 32 in each disc 1 and 2 are, advantageously, filled with oil, so that the cam disc, the pins 31 and the springs 35 are constantly surrounded by oil. By the pushing forward of the pins into the cavities 3 of the shaping discs 1 and 2, a small quantity of oil is carried into cavities, so as to provide for a slight lubrication of them as well as to lubricate the pins. The oil is distributed over the surface of the shape by the material which is pressed into the cavities and by this apparently slight lubrication the adhesion of the compressed material is prevented. The flutes or grooves 32 are covered by the plate 49.

The material entering between the two shaping discs 1 and 2 is converted into combustible cores having for example a pellet shape, by the cavities 3. Certain material can be more readily shaped in a warm condition than in a cold. Quite inappreciable variation in the temperature may play a great part in the formation of a material Either it becomes possible to form a shape only at an elevated temperature or on the other hand the shape becomes more accurate by slight elevations of temperature which are easily controllable. In order to render it possible to adjust the temperature of the disc, there is arranged, as shown in Figs. 4 and 5, beneath the point of contact of the discs 1 and 2, a heating device 50 which warms the discs systematically during their rotation. To produce small elevations of temperature electric glow lamps of small dimensions will be sufficient, these being connected with a controlling resistance, whilst for more vigorous heating the gas warming device shown in Fig. 4 may be employed.

In order that these parts of the apparatus represented in Figs. 1–3 or 4–7 may be able to function at all, the plastic material which is supplied between the mold discs must be fed into them in an appropriate way. As large quantities must be produced by the apparatus a machine must be provided for automatically and regularly supplying the plastic material. The material to be treated must be fed to the two mold discs in an unbroken string or ribbon in order to render possible an automatic and continuous working. Furthermore the feeding machine must be capable of adjustment in such a manner that exactly as much material is fed in, in the form of a string, between the discs as the latter are capable of receiving and working up.

Figure 8:
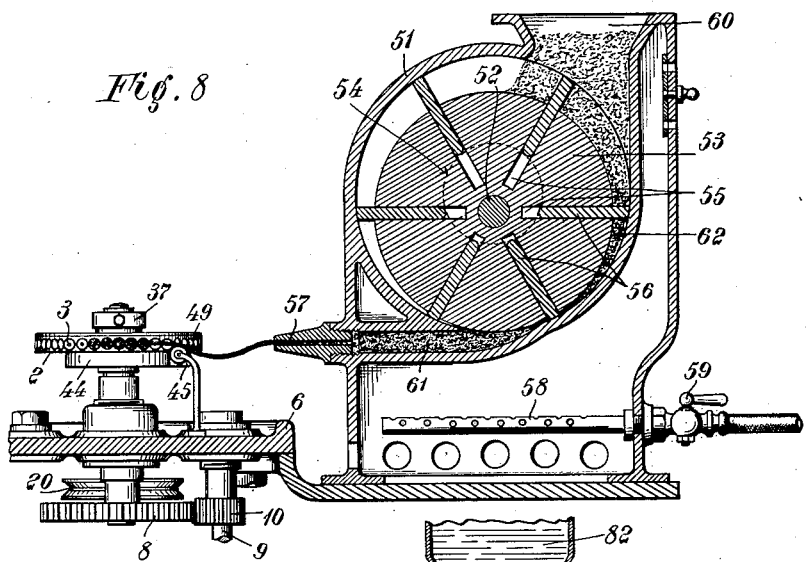
Fig. 8 shows a vertical section of the feeding apparatus for the machine according to Figs. 4 to 7.

The device for producing an unbroken feed of string from the plastic material, at a speed which is exactly adjustable, to the discs of the machine which forms the combustible cores of the igniting pellets is represented in Fig. 8.

In a housing 51 is eccentrically mounted a shaft 52, whereon is secured a cylinder 53 free to rotate about it. On one or on both sides of this cylinder 53 is fitted a disc 54 so as to be immovable in the housing 51 and provided with a bore which is concentric with the disc 54. The cylindrical body 53 is furnished with six slots in which work blades or rammers 56, moved by the disc 54 against the internal wall of the housing and rubbing against the internal wall of the housing.

The material to be treated and which, as is intended will issue from the apparatus in the form of a string is fed to the blades in the housing 51 through a feed opening 60, the blades seizing hold of it and in their rotation about the axis 52, compressing it and conveying it into an outlet pipe 61 which terminates in an exchangeable or replaceable nozzle 57. The outlet aperture in the nozzle depends on the shape which it is intended to give to the issuing string. By replacing another nozzle with another outlet cross-section, another shape of string is supplied to the apparatus for producing the combustible cores. Below the housing 51 a heating device or gas burner 58 is provided which may be controlled by the cock 59.

A very suitable material for the manufacture of combustible cores is, for example, a mixture of paraffin, wax etc. with some porous non-combustible substance. This mixture constitutes, at ordinary temperatures, a solid compact mass. When such a mass is supplied to the opening 60, it must, in order to be transformed into an endless unbroken string having a diameter of a few millimeters and at an exactly specified rate, for the discs having the cavities on their circumferences, be possessed of a certain elasticity and plasticity. After it has left the two discs the molded combustible cores must possess a certain hardness and rigidity, so as to be suitable for subsequent treatment.

If the material be supplied in the form of powder, grains or minute pieces then it must be capable of being transformed into an endless cord, must remain plastic for some time, and then again become hard. By the heating and the possibility of bringing the entire conveying apparatus to a definite temperature and of maintaining the latter during the operation, the mixture of paraffin and porous material which is supplied at 60 in the form of powder or grain or of shavings of uniform granulation is converted into a uniform cord. It is advantageous to feed the mass to the blade apertures of the expressing device at the same temperature and in constantly similar form so that the material may be readily carried along by the blades, that convey the material from the feed aperture 60 to the space 62 of the expression device which is closed on all sides. The material is first compressed and at the same time, by heating, raised to a higher temperature. The material becomes plastic, the operation of compression is continuous and the erstwhile powder becomes by heating and pressure converted into a homogeneous plastic mass emerging from the nozzle 57 in the form of an unbroken string.

By varying the angular velocity, the displacement of the string may be controlled and made to agree with the angular velocity of the two mold discs. The latter mechanism may also be made to adjust its working capacity to the feeding apparatus. More especially it is possible, when the mass to be treated consists of a homogeneous soft and plastic substance, to feed it into the conveying apparatus in a steady current, for example by means of a funnel arrangement of a discharge device or a worm conveyor. The emerging string will then possess a continuity which is of practical advantage. On the other hand when the material is powdery and solid and must first therefore be made plastic by heating it, it is first compressed and then heated and extruded. The pressure at the outlet nozzle is, as a result of the compression period, an intermittent one. Until the loose powder has been compressed to a homogeneous mass, the pressure is variable and only remains constant until the material has left the blade chamber in question. This irregularity in the emergence of the string from the nozzle is intolerable, as the discs rotate at constant speed, and in order to compensate for the irregularity the string is not allowed to emerge at the point of contact of the two discs, but the nozzle 57 is arranged at a distance from this point of contact and the string is not allowed to come in a straight line, that is by the shortest way, to the mold disc 5 but is allowed to hang free for a distance.

This free hanging string compensates for the irregularity in the exit speed and the mold discs draw the cord in between them in absolute uniformity.

If the cavities in the two discs of the machine indicated above have a hemispherical form then the combustible cores emerge from the machine in the form of small spheres and in a continuous stream, however, the cavities in the discs may have any other shape.

Figure 9:
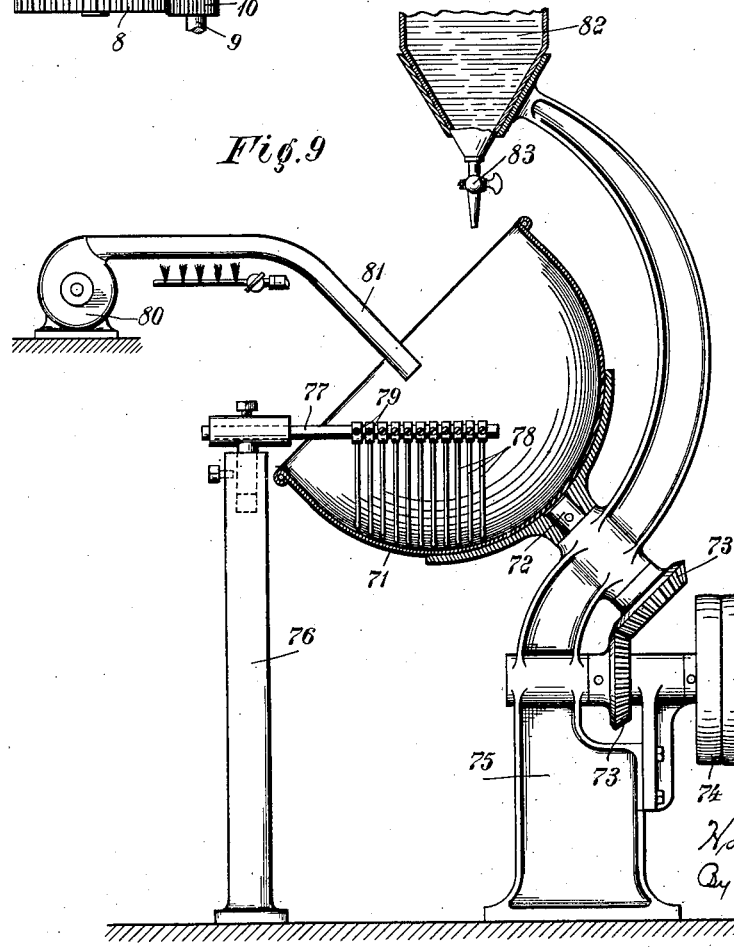
Fig. 9 shows that part of the apparatus used for finishing the pellets by the coating of the combustible cores which leave the machine according to Figs. 4–7 and 1–3, with combustible material.

In Fig. 9 is represented the part of apparatus for the finishing treatment of such combustible cores made from combustible, flame-producing material, i. e. for the coating of these with ignition material which can then be kindled on a rough surface or on a specially prepared surface by simple friction.

A holder 71, intended to act as a priming vessel and having a hemispherical bottom, is rigidly mounted on a shaft 72. The latter is inclined at an angle of about 45° to the horizontal so that the vessel 71 always occupies an oblique situation. The shaft 72 is made to rotate slowly by a bevel gear 73, and two belt pulleys 74, one idle and the other fast. The shaft 72 is mounted in a frame 75. On a standard 76 is mounted a vertically adjustable arm 77, at the end of which there is arranged rake- or comb-like prongs 78 projecting downwards to the bottom of the holder 71. The prongs or rods may be displaced along the arm 77 being held by screws 79. The separate prongs are so adjusted that the distance of one from the next succeeding prong is a little greater than the diameter of the combustible cores to be treated in the holder, so that the cores can only move individually through between the prongs. Further a fan 80 is provided to drive a current of air of any desired temperature through a pipe 81 into the interior of the holder 71 to render as speedy a drying as possible, during the rotation of the drum 71, of the ignition material for the rolling combustible cores and to prevent the individual pellets from sticking to each other. Above the agitating apparatus 78 or above the holder 71 is situated a vessel 82 for the supply of the ignition material to the holder in quantity which may be controlled by some means as, for example, a cock 83.

The mode of operation of the part of the apparatus described and shown in Fig. 9 is as follows:

The bodies issuing from a machine for the manufacture of combustible cores are, for example, of spherical shape having a diameter of, say, 5 millimetres each. In one day several millions of such pellets are produced, and must then be coated uniformly with ignition material of say about ½ mm thickness. Several millions of the pellets are placed into the holder 71 which is then rotated slowly. As a result of the hemispherical form of the bottom of the holder 71 and the inclined position of the latter there is produced a rotation and mixture of the contents, that is to say of the pellets. By constant rolling the pellets acquire a shape that is exactly spherical if they were not so already. The fan is operated and the ignition material, in a semifluid condition of thin paste, is dropped slowly on the pellets while steadily rotating and rolling and also constantly mixed with each other by the agitating device. By the rolling and mixing action of the drum and the prongs of the agitator, the ignition material distributes itself uniformly over the small spheres. A speedy drying is ensured by the fan so that the pellets do not stick to each other. The rolling action of the obliquely inclined hemisphere ensures the maintainance of the spherical form by the pellets. Any pellets which may possibly adhere to each other are parted by the agitator, because the spacing of the prongs is adjusted in such a way that any two pellets adhering to each other cannot pass through side by side. The fan, the temperature of the current of air from which can be controlled at will, effects a speedy drying of the ignition material on the rolling pellets and prevents in conjunction with the agitator any of them adhering to each other.

By the foreging method millions of pellets may, in a few hours, be provided with an ignition material coat of any desired thickness.

I claim:

1. In apparatus of the type described, the combination of two circumferentially coacting discs adapted to rotate in opposite directions, cavities provided on the circumference of said discs spaced to coincide with each other upon the rotation of said discs, means to feed a plastic string to said discs for being shaped to pellets by said discs, a radial bore communicating with each cavity, a pin slidably arranged in each bore, springs on said pins, a cam disc cooperating with the rear ends of said pins for causing an axial displacement of the latter against the action of said springs whereby the pellets are ejected, and means to cause a momentary lubrication of the interior of said cavities upon the forward movement of each pin.

2. In apparatus of the type described, the combination of two circumferentially coacting discs adapted to rotate in opposite directions, cavities provided on the circumference of said discs spaced to coincide with each other upon the rotation of said discs, means to feed a plastic string to said discs for being shaped to pellets by said discs, a radial bore communicating with each cavity, a pin slidably arranged in each bore, springs on said pins, a cam disc cooperating with the rear ends of said pins for causing an axial displacement of the latter against the action of said springs, whereby the pellets are ejected, means to cause a momentary lubrication of the interior of said cavities upon the forward movement of each pin, driving shafts for said discs, at least one of said discs being loosely mounted on its driving shaft, a plate fixed to said driving shaft, two wings on said plate, a beak provided on said disc and projecting between said wings and a screw for adjusting the distance of the beak from the wings whereby the exact coincidence between the cavities of the coacting discs is attained.

3. The method which comprises feeding a dry mixture, compressing the mixture and forcing it through an extrusion nozzle, heating the compressed mixture before extrusion to render it plastic, feeding the extruded string between matched recessed rolls, heating the rolls at substantially their matching point, ejecting the molded material and simultaneously lubricating the molds preparatory to again rotating into position to receive said material.

4. In a machine of the type described, a hollow, oil containing roll having molding cavities in its periphery and spring retracted cam-actuated ejector pins mounted in said hollow roll, each ejector pin carrying a quantity of oil from the interior of said roll to said cavities during the ejection operation.

In testimony that I claim the foregoing as my invention, I have signed my name.

Dr. HANS GROSSMANN.